(12) United States Patent
Funaoka et al.

(10) Patent No.: US 11,958,128 B2
(45) Date of Patent: Apr. 16, 2024

(54) LASER APPARATUS AND LASER MACHINING APPARATUS

(71) Applicant: Mitsubishi Electric Corporation, Tokyo (JP)

(72) Inventors: Koji Funaoka, Tokyo (JP); Tatsuya Yamamoto, Tokyo (JP); Yuzuru Tadokoro, Tokyo (JP); Masayuki Saiki, Tokyo (JP); Hiromasa Mihara, Tokyo (JP); Yoshiharu Kurosaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/027,632

(22) PCT Filed: Jun. 30, 2021

(86) PCT No.: PCT/JP2021/024817
§ 371 (c)(1),
(2) Date: Mar. 22, 2023

(87) PCT Pub. No.: WO2023/276064
PCT Pub. Date: Jan. 5, 2023

(65) Prior Publication Data
US 2023/0271273 A1 Aug. 31, 2023

(51) Int. Cl.
*B23K 26/0622* (2014.01)
*B23K 26/064* (2014.01)

(52) U.S. Cl.
CPC ........ *B23K 26/0622* (2015.10); *B23K 26/064* (2015.10)

(58) Field of Classification Search
CPC ............ B23K 2103/172; B23K 26/067; B23K 26/0676; B23K 26/082; B23K 26/40
(Continued)

(56) References Cited

U.S. PATENT DOCUMENTS 5,825,793 A * 10/1998 Miyai ................ H01S 3/13
372/105
7,382,983 B2 * 6/2008 Mizuma ............... H01Q 3/2676
343/893
(Continued)

FOREIGN PATENT DOCUMENTS

JP 5-199374 A 8/1993
JP 9-275236 A 10/1997
(Continued)

OTHER PUBLICATIONS

International Search Report and Written Opinion dated Sep. 21, 2021, received for PCT Application PCT/JP2021/024817, filed on Jun. 30, 2021, 11 pages including English Translation.
(Continued)

*Primary Examiner* — Chris Q Liu
(74) *Attorney, Agent, or Firm* — XSENSUS LLP

(57) ABSTRACT

A laser apparatus includes a laser oscillator; an acousto-optic modulation unit including a first acousto-optic modulator that diffracts a laser beam from the laser oscillator when a first ultrasonic wave is applied and a second acousto-optic modulator that diffracts a higher order beam output from the first acousto-optic modulator when a second ultrasonic wave is applied; and an amplifier that amplifies the laser beam from the acousto-optic modulation unit, a propagation direction of the first ultrasonic wave relative to a diffracted direction of the higher order beam emitted from the first acousto-optic modulator and a propagation direction of the second ultrasonic wave relative to a diffracted direction of a higher order beam emitted from the second acousto-optic modulator being different.

19 Claims, 11 Drawing Sheets

(58) Field of Classification Search
USPC .................................. 219/121.74, 121.77
See application file for complete search history.

(56) References Cited

U.S. PATENT DOCUMENTS

| | | | |
|---|---|---|---|
| 7,724,413 B2 * | 5/2010 | Koyata | H04N 9/3161 |
| | | | 359/278 |
| 8,730,568 B2 * | 5/2014 | Tong | H01S 3/0057 |
| | | | 359/333 |
| 10,408,925 B1 | 9/2019 | Manzur | |
| 2002/0136524 A1 | 9/2002 | Agha Riza | |
| 2005/0056626 A1 | 3/2005 | Gross et al. | |
| 2006/0050747 A1 | 3/2006 | Trutna, Jr. et al. | |
| 2007/0041081 A1 | 2/2007 | Chu | |
| 2012/0033807 A1 | 2/2012 | Asim et al. | |
| 2012/0062984 A1 | 3/2012 | Tong et al. | |
| 2012/0307257 A1 | 12/2012 | Yoshii et al. | |
| 2017/0023843 A1 | 1/2017 | Seifert | |
| 2017/0310070 A1 | 10/2017 | Staupendahl | |
| 2018/0180655 A1 | 6/2018 | Kuse et al. | |

FOREIGN PATENT DOCUMENTS

| | | |
|---|---|---|
| JP | 2005-161398 A | 6/2005 |
| JP | 2006-080512 A | 3/2006 |
| JP | 2006-229229 A | 8/2006 |
| JP | 2009-527775 A | 7/2009 |
| JP | 2011-187947 A | 9/2011 |
| JP | 2012-182397 A | 9/2012 |
| JP | 2012-523734 A | 10/2012 |
| JP | 2013-541201 A | 11/2013 |
| JP | 2017-535063 A | 11/2017 |
| JP | 2021-030249 A | 3/2021 |

OTHER PUBLICATIONS

Notice of Reasons for Refusal dated Nov. 30, 2021, received for JP Application 2021-566595, 7 pages Including English Translation.
Notice of Reasons for Refusal dated Feb. 1, 2022, received for JP Application 2021-566595, 6 pages Including English Translation.
Decision to Grant dated Mar. 29, 2022, received for JP Application 2021-566595, 6 pages including English Translation.

* cited by examiner $D2 = k_{d2} - k_{d1} = S2$ $\nu_{d1} + \nu_{s2} = \nu_{d2}$

LASER APPARATUS AND LASER MACHINING APPARATUS

CROSS-REFERENCE TO RELATED APPLICATION

The present application is based on PCT filing PCT/JP2021/024817, filed Jun. 30, 2021, the entire contents of which are incorporated herein by reference.

FIELD

The present disclosure relates to a laser apparatus using acousto-optic modulators and also relates to a laser machining apparatus.

BACKGROUND

An acousto-optic modulator uses a material having a property of changing its refractive index when vibrated by an ultrasonic wave and is thus an element utilized as a diffraction grating. For the acousto-optic modulator, a grating constant of the diffraction grating can be controlled by a frequency of the ultrasonic wave to be applied. A diffracted beam that is output by the acousto-optic modulator has a frequency shifted by the frequency of the ultrasonic wave due to the Doppler effect.

Patent Literature 1 discloses a light source apparatus using two acousto-optic modulators. This light source apparatus includes the two acousto-optic modulators within a resonator. The acousto-optic modulators each cause a frequency shift in a different direction to reduce a frequency shift of an outgoing beam, thus reducing or preventing output power fluctuation.

CITATION LIST

Patent Literature

Patent Literature 1: Japanese Patent Application Laid-open No. 2011-187947

SUMMARY

Technical Problem

However, according to the above-described conventional technique, the acousto-optic modulators are disposed within the resonator. The acousto-optic modulator has lower light-resisting strength than other optical elements, such as mirrors. Therefore, when the acousto-optic modulators are disposed within the resonator, it is required that intensity of a laser beam that enters the resonator to be reduced correspondingly to the acousto-optic modulator's light-resisting strength, which results in a problem in that the outgoing beam has a reduced intensity.

The present disclosure has been made in view of the above, and an object of the present disclosure is to obtain a laser apparatus that allows to reduce or prevent output power fluctuation and increase laser output power.

Solution to Problem

To solve the above problem and achieve an object, a laser apparatus according to the present disclosure includes: a laser oscillator; an acousto-optic modulation unit including a first acousto-optic modulator to diffract a laser beam from the laser oscillator when a first ultrasonic wave is applied and a second acousto-optic modulator to diffract a higher order beam output from the first acousto-optic modulator when a second ultrasonic wave is applied, a propagation direction of the first ultrasonic wave relative to a diffracted direction of a higher order beam emitted from the first acousto-optic modulator and a propagation direction of the second ultrasonic wave relative to a diffracted direction of a higher order beam emitted from the second acousto-optic modulator being different; and an amplifier to amplify a laser beam from the acousto-optic modulation unit.

Advantageous Effects of Invention

The laser apparatus according to the present disclosure has effects of reducing or preventing output power fluctuation and providing increased laser output power.

DESCRIPTION OF EMBODIMENTS

With reference to the drawings, a detailed description is hereinafter provided of laser apparatuses and a laser machining apparatus according to embodiments of the present disclosure. It is to be noted that the following embodiments are not restrictive of the technical scope of the present disclosure.

First Embodiment

Figure 1:
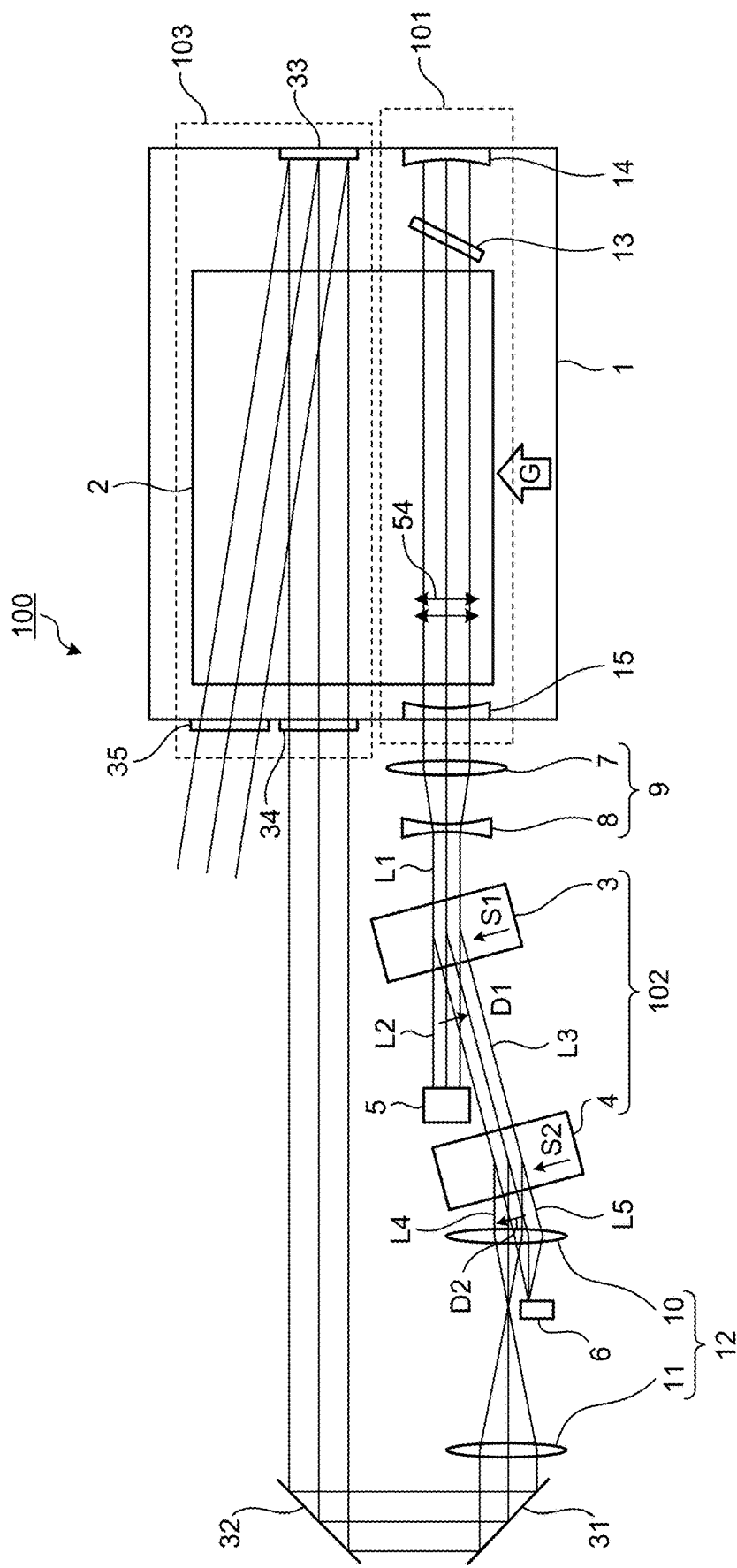
FIG. 1 is a diagram illustrating a configuration of a laser apparatus according to a first embodiment.

FIG. 1 is a diagram illustrating a configuration of a laser apparatus 100 according to a first embodiment. The laser apparatus 100 includes a laser oscillator 101, an acousto-optic modulation unit 102, and an amplifier 103. The laser apparatus 100 is an external modulation oscillator that converts a laser beam L1 that is a continuous-wave output from the laser oscillator 101 into a pulsed laser beam with the acousto-optic modulation unit 102, and then amplifies the pulsed laser beam with the amplifier 103. The laser oscillator 101 includes a totally reflecting mirror 14, a partially reflecting mirror 15, and a Brewster window 13. The acousto-optic modulation unit 102 includes a first acousto-optic modulator 3 and a second acousto-optic modulator 4 that are connected in series. The amplifier 103 includes windows 34 and 35 and a mirror 33.

The laser oscillator 101 and the amplifier 103 are disposed in the housing 1, and a laser gas G is supplied into the housing 1. The housing 1 separates the laser gas G from outside air. For ease of understanding, in this configuration, the laser oscillator 101 and the amplifier 103 have optical axes along a Y-direction, the laser gas G is supplied in a Z-direction, and an X-direction is perpendicular to the Y-direction and the Z-direction.

FIG. 1 mainly illustrates how optical elements are configured and may include constituent elements not illustrated. For example, those (not illustrated) such as a heat exchanger and a blower are provided in the housing 1. The blower circulates the laser gas G enclosed within the housing 1. With the blower's circulation of the laser gas G, the laser gas G cooled via forced convection is supplied along the arrowed Z-direction. Inside the housing 1, the laser gas G is maintained at a pressure lower than atmospheric pressure and moves at a speed of, for example, about 100 m/s.

When molecules or atoms in the laser gas G are excited to an upper laser level by a discharge, the molecules or the atoms exhibit an optical amplification action. In cases where, for example, the laser gas G to be used is a mixed gas including $CO_2$ molecules, an oscillated laser beam with a wavelength of 10.6 μm is obtained by transitions between vibrational levels of the $CO_2$ molecules. Although it is explained that the laser gas G is the mixed gas including $CO_2$ in the description here, other laser media such as CO, $N_2$, He—Cd, HF, Art, ArF, KrF, XeCl, XeF, YAG, and some glasses may be used as alternatives instead of the mixed gas that includes $CO_2$.

Discharge electrodes (not illustrated) are installed in the housing 1 to cause discharge excitation to the laser gas G. When a high-frequency alternating-current voltage is applied between the discharge electrodes, a discharge space is generated in the form of a rectangular parallelepiped having an approximately 3 cm×3 cm×100 cm size. The laser gas G presents in this discharge space serves as a discharge pumped gas 2 that is a laser medium that exhibits the optical amplification action.

The totally reflecting mirror 14 and the partially reflecting mirror 15 are disposed to face each other across the discharge pumped gas 2 and constitute an optical resonator. The totally reflecting mirror 14 and the partially reflecting mirror 15 are each attached to the housing 1 via an angular fine-adjustment mechanism that provides optical axis adjustment.

The Brewster window 13 of the laser oscillator 101 is provided on the optical axis between the totally reflecting mirror 14 and the partially reflecting mirror 15. The Brewster window 13 is a window having a higher reflectivity for s-polarized light and a lower reflectivity (for example, less than 1%) for p-polarized light. The laser beam that has linearly polarized light 54 parallel to a YZ plane is selectively caused to oscillate here. Providing the Brewster window 13 allows the laser beam of linearly polarized light 54 to enter the acousto-optic modulation unit 102. Thus, it is achieved that a polarization direction of each of laser beams that enter the first and second acousto-optic modulators 3 and 4 coincides with a direction of propagation S of each of ultrasonic waves that are applied to the first and second acousto-optic modulators 3 and 4. The laser oscillator 101 may have polarization locking mirrors instead of the Brewster window 13.

The laser apparatus 100 further includes a down collimator 9 disposed on an optical path between the laser oscillator 101 and the acousto-optic modulation unit 102, dampers 5 and 6 that absorb incoming beams, and an expander 12 that expands a beam diameter of the pulsed laser beam output from the acousto-optic modulation unit 102.

The down collimator 9 includes a positive lens 7 and a negative lens 8, and reduces a beam diameter of the laser beam L1 output from the laser oscillator 101 and causes the laser beam L1 to enter the acousto-optic modulation unit 102. The beam diameter of the laser beam L1 output from the down collimator 9 is a beam diameter φ that enables incidence on the first acousto-optic modulator 3 and is, for example, about 8 mm. Because diffraction efficiency of each of the first and second acousto-optic modulators 3 and 4 varies depending on an angle of incidence, if an incident beam is not a parallel beam, a beam profile of an outgoing beam is variable. Therefore, the incident beam is assumed to be a parallel beam here.

When the ultrasonic wave is applied, a refractive index of each of the first and second acousto-optic modulators 3 and 4 changes due to a compressional wave in a transparent material. Therefore, the first and second acousto-optic modulators 3 and 4 are utilized as diffraction gratings.

With the application of the first ultrasonic wave, the first acousto-optic modulator 3 diffracts the laser beam L1 from the laser oscillator 101 and outputs a zeroth order beam L2 and the first order beam L3. The zeroth order beam L2 output from the first acousto-optic modulator 3 is optically absorbed by the damper 5. The first order beam L3 output from the first acousto-optic modulator 3 enters the second acousto-optic modulator 4. While the first order beam L3 is used as an example of a higher order beam here, the higher order beam may be, for example, a second order beam. The first acousto-optic modulator 3 is disposed so that the propagation direction S1 of the first ultrasonic wave becomes opposite to a diffracted direction D1 of the first order beam L3.

With the application of the second ultrasonic wave, the second acousto-optic modulator 4 diffracts the first order beam L3 output from the first acousto-optic modulator 3 and outputs a zeroth order beam L5 and the first order beam L4. The zeroth order beam L5 output from the second acousto-optic modulator 4 is optically absorbed by the damper 6. The first order beam L4 output from the second acousto-optic modulator 4 enters the expander 12. The second acousto-optic modulator 4 is disposed so that the propagation direction S2 of the second ultrasonic wave is the same as a diffracted direction D2 of the first order beam L4.

In the above-described example, the diffracted direction D1 is opposite to the propagation direction S1, and the diffracted direction D2 is the same as the propagation direction S2; however, it suffices that the propagation direction S1 relative to the diffracted direction D1 and the propagation direction S2 relative to the diffracted direction D2 are different to each other.

The intention where the propagation direction S1 relative to the diffracted direction D1 differs from the propagation direction S2 relative to the diffracted direction D2 is that, orientation of the propagation direction S1 with reference to the diffracted direction D1 differs from orientation of the propagation direction S2 with reference to the diffracted direction D2, not that the propagation direction S1 is different from the propagation direction S2. For example, the diffracted direction D1 may be the same as the propagation direction S1 while the diffracted direction D2 is opposite to the propagation direction S2. In this way, a direction of a frequency shift that is caused by the first acousto-optic modulator 3, is caused to be opposite to a direction of a frequency shift that is caused by the second acousto-optic modulator 4. Consequently, a frequency shift that is caused to the pulsed laser beam to be output from the acousto-optic modulation unit 102 can be reduce.

The acousto-optic modulation unit 102 that includes the first and second acousto-optic modulators 3 and 4 converts the continuous-wave laser beam L1 output from the laser oscillator 101 into the pulsed laser beam. Specifically, the acousto-optic modulation unit 102 is capable of converting the laser beam L1 from the laser oscillator 101 into the pulsed laser beam by intermittently operating at least one of the first acousto-optic modulator 3 and the second acousto-optic modulator 4. When the first acousto-optic modulator 3 is intermittently operated, the first acousto-optic modulator 3 is intermittently supplied with an alternating-current voltage from a driver circuit not illustrated. When the first acousto-optic modulator 3 is supplied with the alternating-current voltage, the first order beam L3 enters the second acousto-optic modulator 4. In the absence of the alternating-current voltage, the laser beam L1 travels straight and is absorbed by the damper 5. When the second acousto-optic modulator 4 is intermittently operated, the second acousto-optic modulator 4 is intermittently supplied with the alternating-current voltage from the driver circuit. When the second acousto-optic modulator 4 is supplied with the alternating-current voltage, the first order beam L4 enters the expander 12. In the absence of the alternating-current voltage, the first order beam L3 from the first acousto-optic modulator 3 travels straight and is absorbed by the damper 6. It is possible to reduce power consumption by the acousto-optic modulation unit 102 when both the first and second acousto-optic modulators 3 and 4 are in intermittent operation as compared to when only one of the first and second acousto-optic modulators 3 and 4 is in intermittent operation.

The expander 12 includes lenses 10 and 11. The expander 12 is disposed on an optical path between the acousto-optic modulation unit 102 and the amplifier 103 and expands the beam diameter of the first order beam L4 output from the second acousto-optic modulator 4 of the acousto-optic modulation unit 102. Because the expander 12 expands the beam diameter, the amplifier 103 is enabled to have an increased amplification factor. An aperture of the acousto-optic modulator is typically in the order of a few millimeters. The expander 12 is capable of expanding the beam diameter to, for example, about 20 mm.

The laser oscillator 101 of the laser apparatus 100 is filled with, between the totally reflecting mirror 14 and the partially reflecting mirror 15, the discharge pumped gas 2 that has the optical amplification function and outputs the continuous-wave laser beam L1 of linearly polarized light 54 because the Brewster window 13 is disposed on the optical path between the totally reflecting mirror 14 and the partially reflecting mirror 15. The laser beam L1 output from the partially reflecting mirror 15 of the laser oscillator 101 has its beam diameter reduced by the down collimator 9 and enters the first acousto-optic modulator 3 of the acousto-optic modulation unit 102.

The laser beam L1 is diffracted by the first acousto-optic modulator 3. As a result, the first order beam L3 enters the second acousto-optic modulator 4, and the zeroth order beam L2 is absorbed by the damper 5. The first order beam L3 that has entered the second acousto-optic modulator 4 is diffracted. As a result, the first order beam L4 enters the expander 12, and the zeroth order beam L5 is absorbed by the damper 6. The first order beam L4 that has entered the expander 12 has its beam diameter expanded through the lenses 10 and 11 and is output to a mirror 31. The beam output from the expander 12 has its traveling direction changed by the mirror 31 and a mirror 32 and enters the window 34 of the amplifier 103. The laser beam that has entered the window 34 is amplified by passing through the space filled with the discharge pumped gas 2 that has the optical amplification function, is reflected by the mirror 33, and is taken out of the laser apparatus 100 through the window 35. The laser beam taken out through the window 35 is used in, for example, laser beam machining or the like.

As described above, the acousto-optic modulation unit 102 according to the present embodiment has the two acousto-optic modulators. The first order beam L3 from the first acousto-optic modulator 3 enters the second acousto-optic modulator 4, and the first order beam L4 from the second acousto-optic modulator 4 enters the window 34 of the amplifier 103. The first order beam is used here for preventing output of the beam when the beam is off. Because the diffraction efficiency of the acousto-optic modulator is about 90%, if the zeroth order beam is used, 10% will be output for the zeroth order beam. If the zeroth order beam that corresponds to this 10% is amplified, extra heat that does not contribute to laser beam machining that uses the laser beam output from the laser apparatus 100 will accumulate in a workpiece, and machining quality is decreased.

The first order beam that the acousto-optic modulator outputs is known to have undergone the frequency shift caused by ultrasonic energy. However, disposing the acousto-optic modulator between the laser oscillator 101 and the amplifier 103 often does not result in a major problem, because there is only a slight decline in output power. As a finding from the inventors of the present application, the output power fluctuates sharply when the frequency shift in the acousto-optic modulator and a phenomenon in the laser oscillator 101, called mode hopping, occur in conjunction.

The mode hopping is a phenomenon that an oscillation frequency of a resonator changes instantaneously, resulting from a change in optical path length between mirrors of the resonator that is caused by a temperature change of a structural component, a temperature change of a medium, or another factor. The optical path length between the mirrors of the resonator is hereinafter referred to as the cavity length. A cavity length of the laser oscillator 101 refers to an optical path length between the totally reflecting mirror 14 and the partially reflecting mirror 15.

Figure 2:
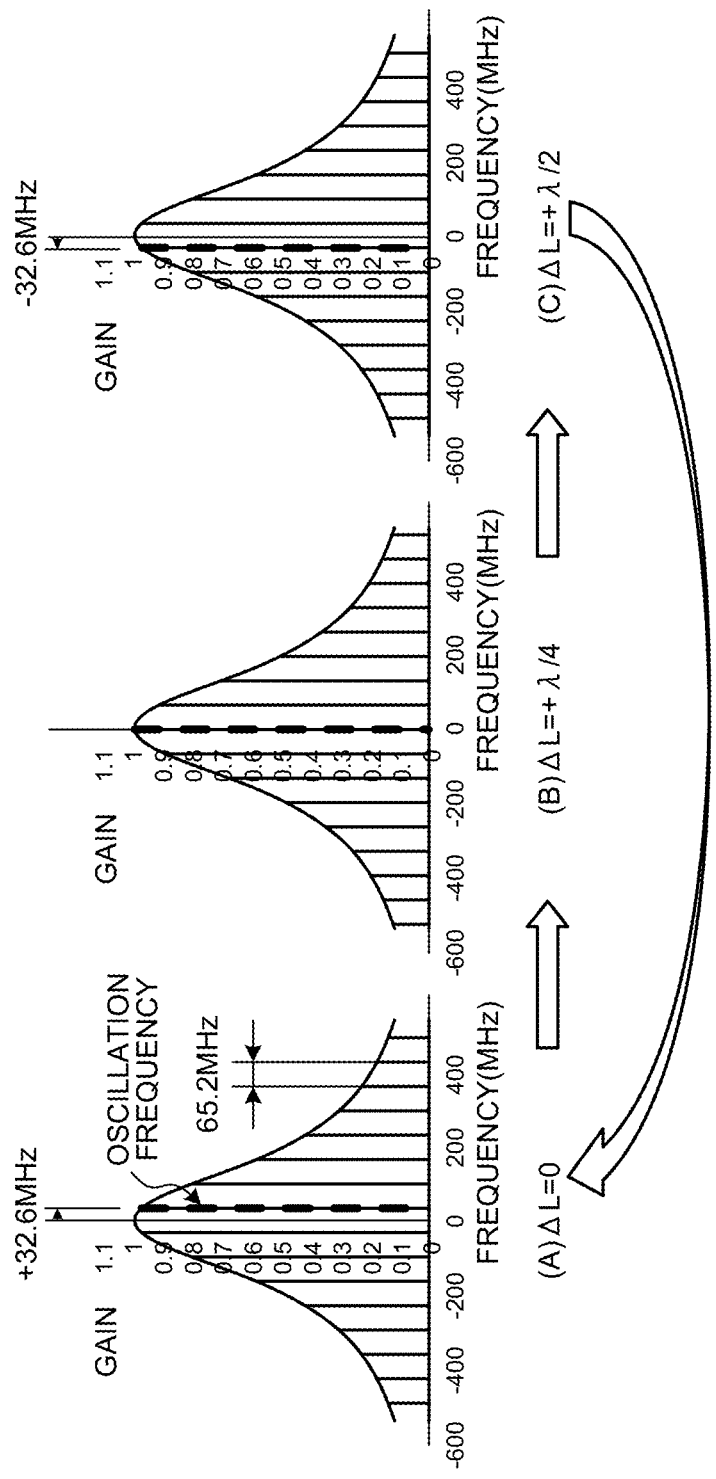
FIG. 2 is a diagram illustrating how a frequency changes when mode hopping occurs.

FIG. 2 is a diagram illustrating how the frequency changes when the mode hopping occurs. In FIG. 2, a horizontal axis represents the frequency, and a vertical axis represents gain. A thick dashed line in FIG. 2 represents a longitudinal mode with the highest gain, and the laser oscillator 101 provides oscillation at this frequency. In FIG. 2, a middle drawing (B) illustrates a state that results when the cavity length changes by a quarter wavelength from a state illustrated in a left drawing (A), and a right drawing (C) illustrates a state that results when the cavity length changes by another quarter wavelength from the state illustrated in the middle drawing (B). In other words, the right drawing (C) illustrates the state that results when the cavity length changes by a half wavelength from the state illustrated in the left drawing (A).

As the cavity length increases, the frequency of the longitudinal mode decreases, and the thick dashed line shifts leftward in the figure. Specifically, the oscillation frequency is +32.6 MHz in the state (A), ±0 MHz in the state (B), and −32.6 MHz in the state (C). When the frequency of the longitudinal mode decreases further from (C), the laser oscillator 101 transitions to the state (A), because the gain of the longitudinal mode on a side with one higher frequency is higher.

Figure 3:
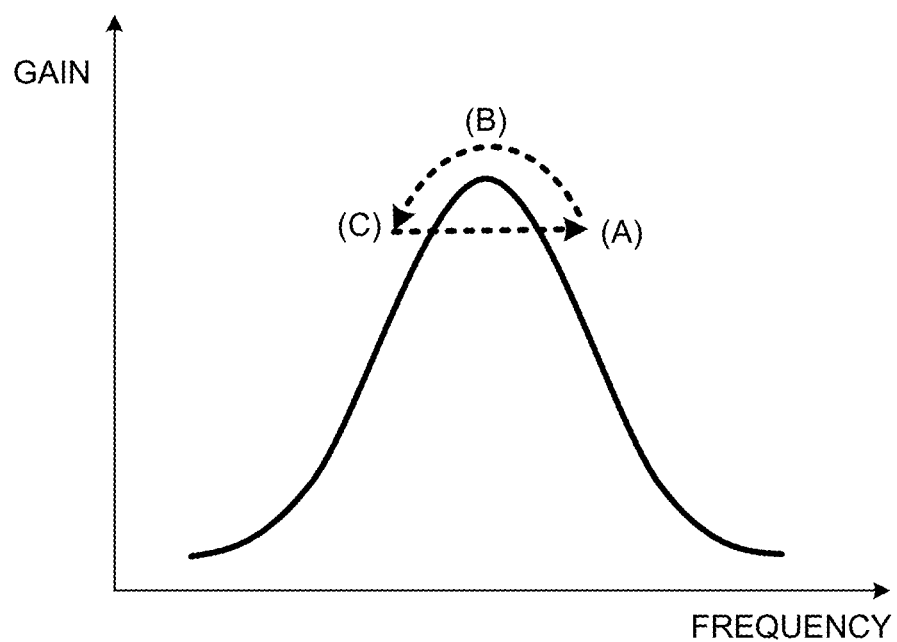
FIG. 3 is a diagram schematically illustrating state transitions illustrated in FIG. 2.

FIG. 3 is a diagram schematically illustrating the state transitions illustrated in FIG. 2. The laser oscillator 101 transitions from the state (A) to the state (B) and from the state (B) to the state (C). The laser oscillator 101 also transitions from the state (C) to the state (A). The state (C) and the state (A) have their respective frequencies in symmetrical relation with respect to a gain peak and thus provide the same gain. The laser oscillator 101 does not change its output power even when transitioning from the state (C) to the state (A). The longer the cavity length with the output power of the laser oscillator 101 high, the narrower a frequency spacing of the longitudinal modes, so the smaller a fluctuation in output power that is caused by the mode hopping. Therefore, with only the mode hopping, the fluctuation of the output power of the laser apparatus 100 is unlikely to be a problem.

Figure 4:
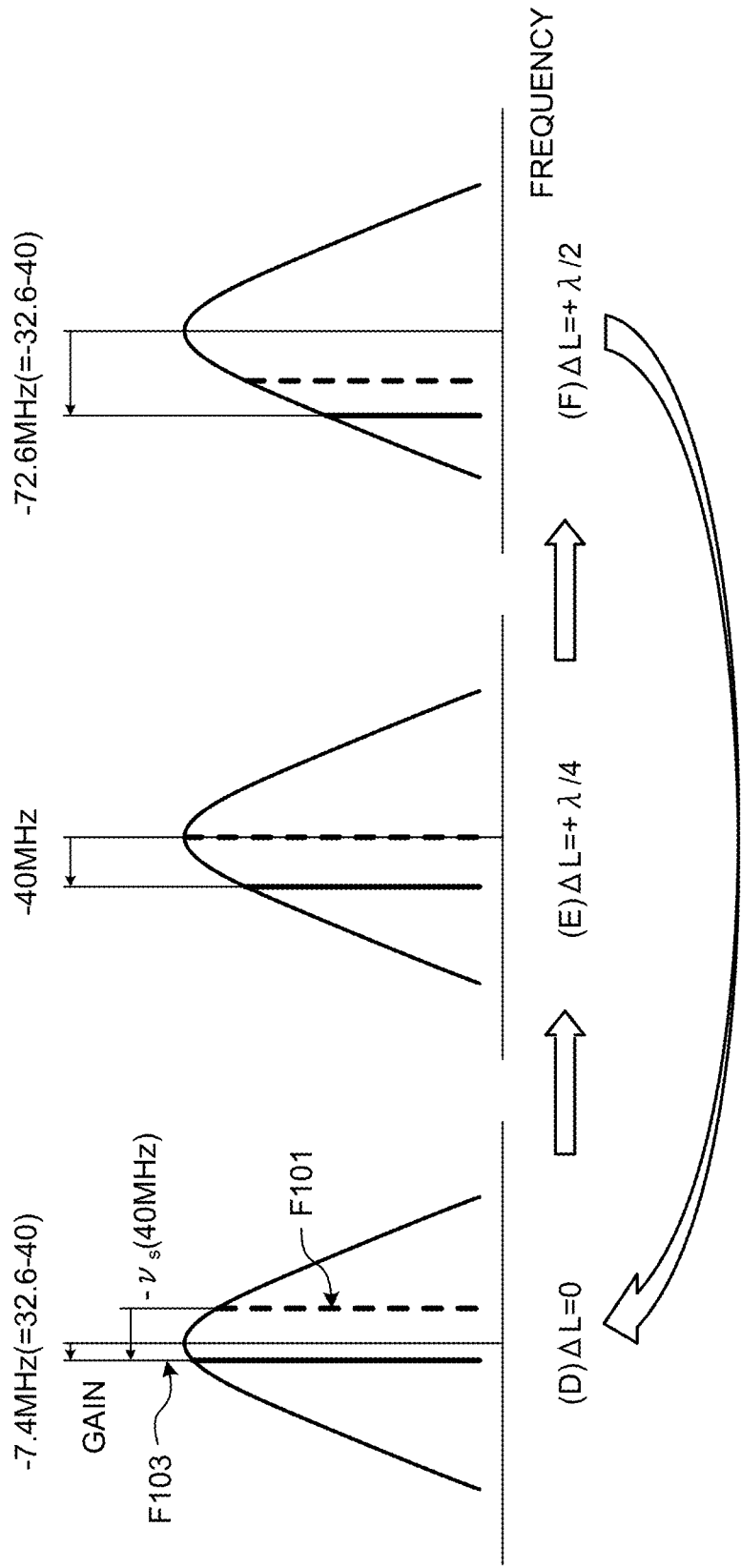
FIG. 4 is a diagram illustrating how the frequency changes when the mode hopping and the Doppler shift occur in conjunction.

A description is provided next of a case where the mode hopping and the Doppler shift occur in conjunction. FIG. 4 is a diagram illustrating how the frequency changes when the mode hopping and the Doppler shift occur in conjunction. When the acousto-optic modulation unit 102 has only one acousto-optic modulator, effect of the Doppler shift cannot be reduced, so there can arise a situation in which the mode hopping and the Doppler shift occur in conjunction. In FIG. 4, a horizontal axis represents the frequency, and a vertical axis represents the gain. A thick dashed line in FIG. 4 represents a longitudinal mode with the highest gain, and the laser oscillator 101 provides oscillation at this frequency. A thick solid line in FIG. 4 represents a beam that enters the amplifier 103. The beam that enters the amplifier 103 has a frequency shifted by the Doppler shift vs in the first and second acousto-optic modulators 3 and 4 of the acousto-optic modulation unit 102 relative to the beam emitted from the laser oscillator 101. In the first embodiment, the Doppler shift vs is −40 MHz.

In FIG. 4, a middle drawing (E) illustrates a state that results when the cavity length changes by a quarter wavelength from a state illustrated by a left drawing (D), and a right drawing (F) illustrates a state that results when the cavity length changes by another quarter wavelength from the state illustrated by the middle drawing (E). In other words, the right drawing (F) illustrates the state that results when the cavity length changes by a half wavelength from the state illustrated by the left drawing (D). As in FIG. 2, the oscillation frequency is +32.6 MHz in the state (D), ±0 MHz in the state (E), and −32.6 MHz in the state (F).

The frequency of the beam that enters the amplifier 103 is +32.6−40=−7.4 MHz in the state (D), 0−40=−40 MHz in the state (E), and −32.6−40=−72.6 MHz in the state (F).

Figure 5:
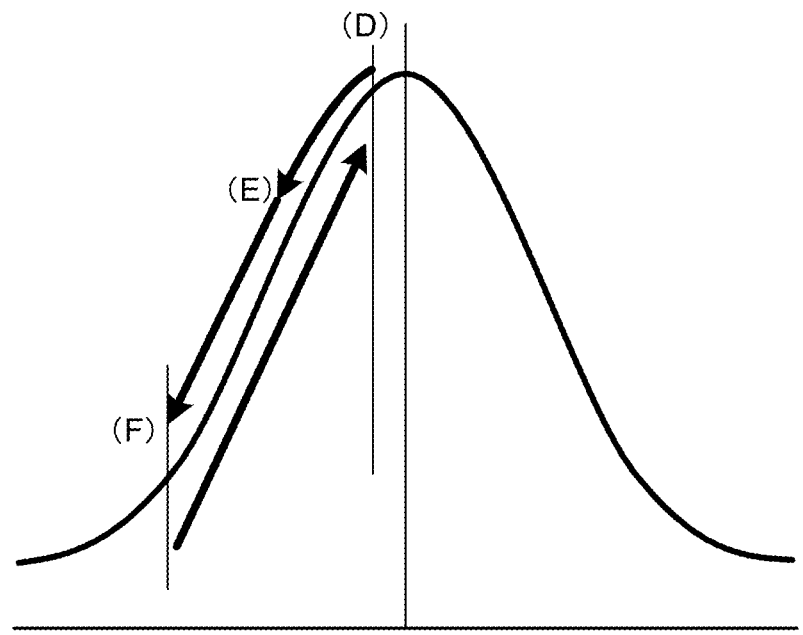
FIG. 5 is a diagram schematically illustrating state transitions illustrated in FIG. 4.

FIG. 5 is a diagram schematically illustrating the state transitions illustrated in FIG. 4. The laser oscillator 101 transitions from the state (D) to the state (E) and from the state (E) to the state (F). The laser oscillator 101 also transitions from the state (F) to the state (D). In this case, the state (D) and the state (F) are in asymmetrical relation with respect to a frequency at which the gain is peak and thus provide significantly different gains. Therefore, the gain significantly changes when transitioning from the state (F) to the state (D).

Figure 6:
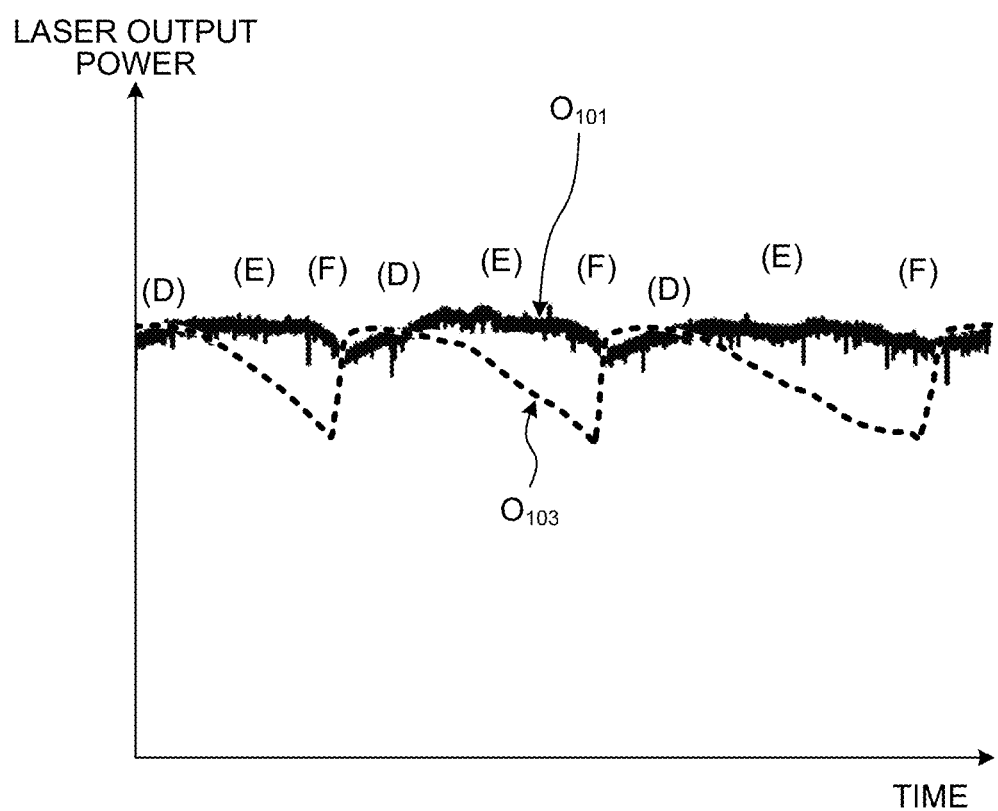
FIG. 6 is a diagram illustrating how laser output power changes in association with the state transitions illustrated in FIG. 4.

FIG. 6 is a diagram illustrating how laser output power changes in association with the state transitions illustrated in FIG. 4. The laser output power $O_{103}$ from the amplifier 103 has a discontinuous and sharp fluctuation when transitioning from the state (F) to the state (D). This fluctuation in output power is larger than a fluctuation in laser output power $O_{101}$ from the laser oscillator 101. In the case of such an instantaneous fluctuation in laser output intensity, the laser output power cannot be stabilized even if feedback control based on measurement of the laser output power by a sensor is performed. Moreover, because a relationship between the frequency shift and how much the gain reduces is nonlinear, the gain reduction is more significant than a mere increase in frequency. In addition, because a fluctuation range of the laser output power is large, there is a problem in that rated output power decreases.

Figure 7:
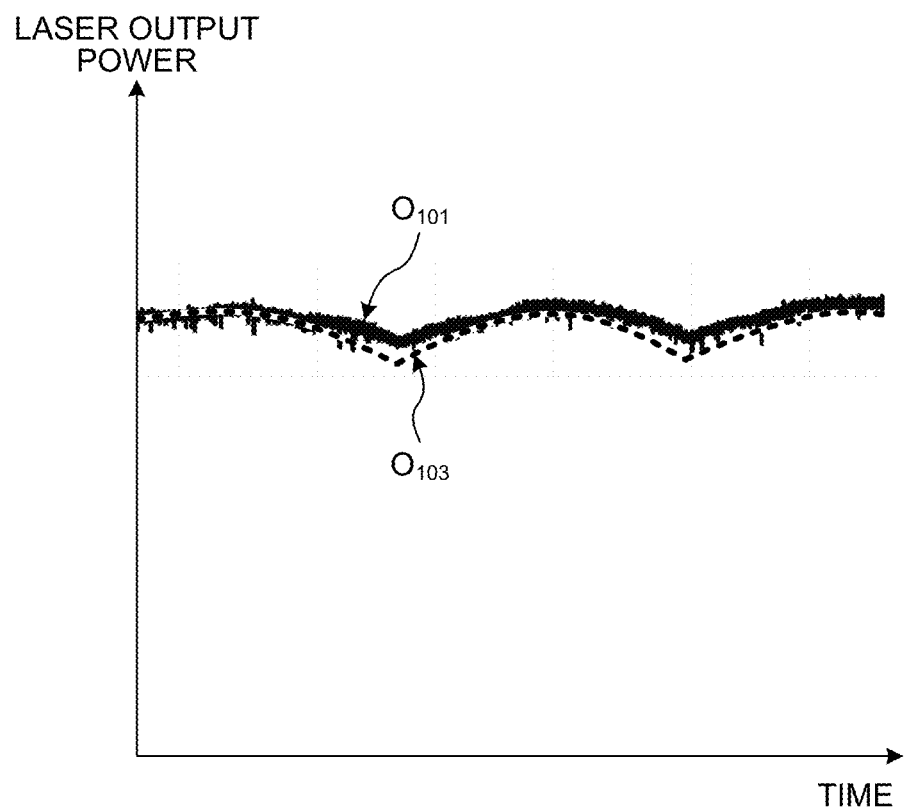
FIG. 7 is a diagram illustrating how the laser output power changes when an acousto-optic modulation unit illustrated in FIG. 1 is used.

FIG. 7 is a diagram illustrating how the laser output power changes when the acousto-optic modulation unit 102 illustrated in FIG. 1 is used. As described above, because the frequency shifts that are caused respectively by the first and second acousto-optic modulators 3 and 4 have the opposite directions, the acousto-optic modulation unit 102 enables the Doppler shift to be canceled. Therefore, as illustrated in FIG. 7, difference between the laser output power $O_{103}$ from the amplifier 103 and the laser output power $O_{101}$ from the laser oscillator 101 is reduced compared with that of the example illustrated in FIG. 6.

Specifically, the first acousto-optic modulator 3 and the second acousto-optic modulator 4 are disposed so that the propagation direction S1 of the first ultrasonic wave relative to the diffracted direction D1 of the first order beam L3 that is emitted by the first acousto-optic modulator 3, differs from the propagation direction S2 of the second ultrasonic wave relative to the diffracted direction D2 of the first order beam L4 that is emitted by the second acousto-optic modulator 4. When the propagation direction S1 is the same as the diffracted direction D1, making the propagation direction S2 opposite to the diffracted direction D2 enables the Doppler shift of the outgoing beam to reduce. When the propagation direction S1 is opposite to the diffracted direction D1, making the propagation direction S2 the same as the diffracted direction D2 enables the Doppler shift of the outgoing beam to reduce.

Figure 8:
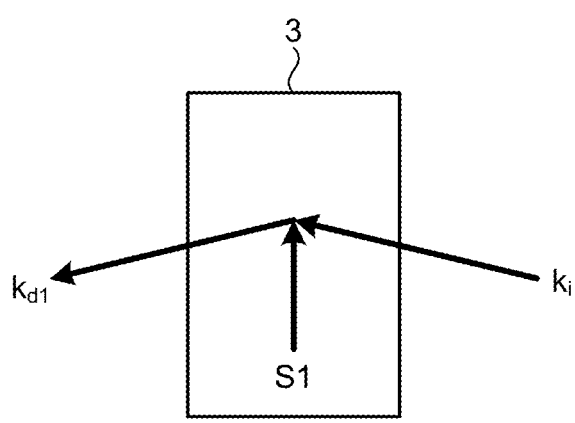
FIG. 8 is a diagram illustrating a frequency shift caused to a beam emitted from a first acousto-optic modulator illustrated in FIG. 1.
Figure 9:
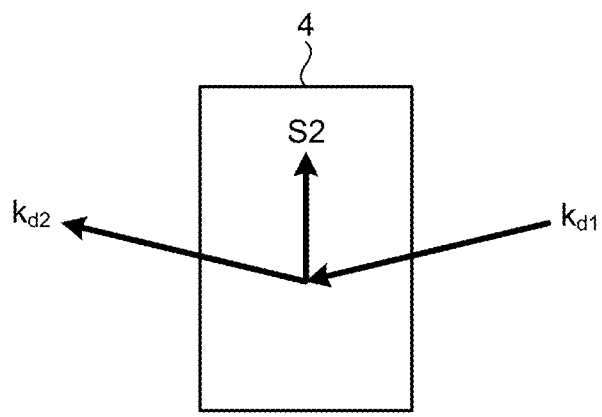
FIG. 9 is a diagram illustrating a frequency shift caused to a beam emitted from a second acousto-optic modulator illustrated in FIG. 1.

FIG. 8 is a diagram illustrating the frequency shift caused to the beam emitted from the first acousto-optic modulator 3 illustrated in FIG. 1. Let $k_i$ be a vector of the beam incident on the first acousto-optic modulator 3, and let $k_{d1}$ be a vector of the emitted beam. Because the diffracted direction D1=$k_{d1}$−$k_i$ is opposite to the propagation direction S1 of the first ultrasonic wave here, the emitted beam has a decreased frequency $v_{d1}=v_i-v_{s1}$ based on the law of conservation of energy. FIG. 9 is a diagram illustrating the frequency shift caused to the beam emitted from the second acousto-optic modulator 4 illustrated in FIG. 1. Because the diffracted direction D2=$k_{d2}$−$k_{d1}$ is the same as the propagation direction S2 of the second ultrasonic wave in the second acousto-optic modulator 4, the emitted beam has an increased frequency $v_{d2}=v_{d1}+v_{s2}$. Therefore, $v_{d2}=v_{d1}+v_{s2}=(v_i-v_{s1})+v_{s2}$, and the frequency shift −$v_{s1}$ that is caused by the first acousto-optic modulator 3 and the frequency shift +$v_{s2}$ that is caused by the second acousto-optic modulator 4 cancel each other out, which reduces the frequency shift that is caused to the beam to be emitted from the acousto-optic modulation unit 102. When the frequency $v_{s1}$ of the first ultrasonic wave is equal to the frequency $v_{s2}$ of the second ultrasonic wave, it becomes that $v_{d2}=v_i$ and the Doppler shift is canceled.

Because the frequency shift that is caused to the beam to be emitted from the acousto-optic modulation unit 102 is reduced, the effect of the Doppler shift on the beam that enters the amplifier 103 is reduced. Therefore, even if the mode hopping occurs, the discontinuous and instantaneous fluctuation in output power is restrained, and the feedback control of the laser output power is possible. In addition, the fluctuation range of the output power is reduced, thus requiring no output margin for the fluctuation range and enabling the rated output power to be higher. Consequently, the laser apparatus 100 stably provides higher output power. When used in laser beam machining, the laser apparatus 100 enables higher-quality and faster laser beam machining.

Figure 10:
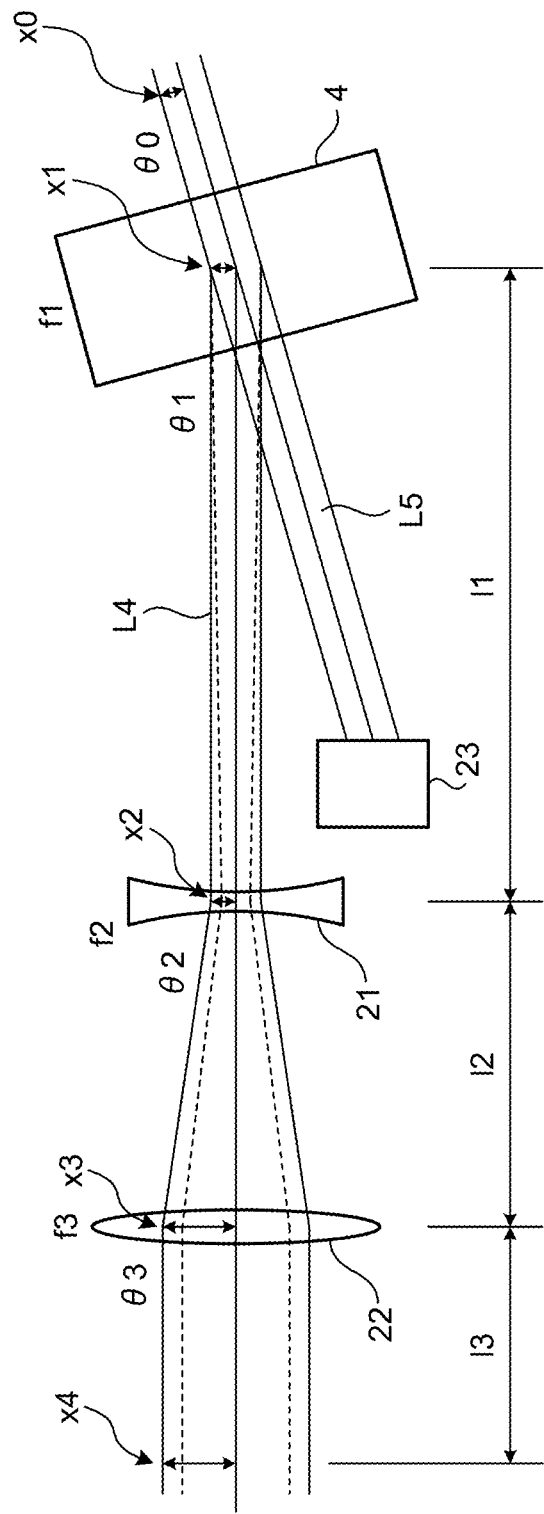
FIG. 10 is a diagram illustrating an example in which a negative lens is used in an expander.
Figure 11:
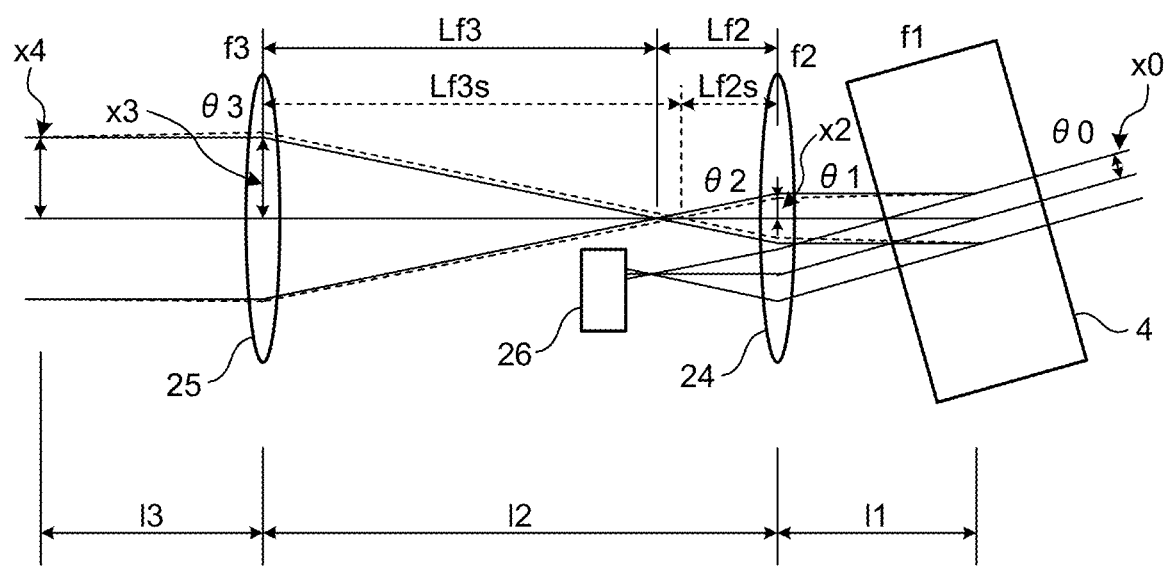
FIG. 11 is a diagram illustrating an example in which a positive lens is used in the expander.

Because the beam diameter of the beam incident on the acousto-optic modulator is small, the beam has increased intensity, and thermal lens effect is easy to occur. An acousto-optic modulator for infrared light of a $CO_2$ laser or another laser uses germanium whose absorptance is as large as about 3%. Therefore, when two acousto-optic modulators are used as in the first embodiment, a particular concern about a thermal lens effect comes up. Accordingly, the lens 10 on an entrance side of the expander 12 is a positive lens in the present embodiment. A description is provided here of a comparison between a case where the lens 10, the first one from the entrance side of the expander 12, is a positive lens and a case where the lens 10 is a negative lens. FIG. 10 is a diagram illustrating the example in which the negative lens is used in the expander 12. FIG. 11 is a diagram illustrating the example in which the positive lens is used in the expander 12.

When the first order beam L4 emitted from the second acousto-optic modulator 4 enters the negative lens 21, as illustrated in FIG. 10, a distance 11 between the second acousto-optic modulator 4 and the negative lens 21 needs to be a distance that is sufficient for separation of the zeroth order beam L5 and the first order beam L4 and long enough to secure space for a damper 23 that absorbs the zeroth order beam L5. As indicated by a dashed line in FIG. 10, a gradient θ1 of a ray of the first order beam L4 changes in a negative direction when the thermal lens occurs. Therefore, the longer the distance 11, the more a beam radius x2 of the laser beam incident on the expander 12 changes to become smaller than a beam radius x1 in the second acousto-optic modulator 4, and an outgoing beam radius x3 at the expander 12 becomes smaller. Moreover, when the expander 12 is configured using the negative lens 21 and a positive lens 22, if gradient θ1 of the incident ray changes in the negative direction, the outgoing beam radius x3 is cased to be smaller. As described above, when the gradient θ1 changes in the negative direction with the beam radius x2 smaller in association with the increase in distance 11, a gradient θ2 of a ray that is emitted from the negative lens 21 and a gradient θ3 of a ray that is emitted from the positive lens 22 also change in a negative direction, and the beam radius x3 of a beam that is emitted from the expander 12 becomes smaller. Accordingly, the beam that enters the amplifier 103 has a smaller diameter, and laser output power after amplification reduces.

In the example illustrated in FIG. 11, the expander 12 is configured using the positive lens 24 and a positive lens 25. In this case, the first order beam L4 and the zeroth order beam L5 that are emitted from the second acousto-optic modulator 4 separate sufficiently near a focal point of the positive lens 24 after entering the positive lens 24, enabling a damper 26 to be disposed near the focal point. The distance 11 between the second acousto-optic modulator 4 and the positive lens 24 is enabled to be shorter in this case than that of the example illustrated in FIG. 10. Because the beam radius x2 becomes smaller in association with the increase in distance 11, reduction of the distance 11 can reduce or prevent the beam radius x2 to be small. Moreover, when the expander 12 is configured using the positive lenses 24 and 25, a change in gradient θ1 of an incident ray in a negative direction causes the focal point of the positive lens 24 to shift upstream. In the absence of the thermal lens, let Lf2 be a distance from the positive lens 24 to the focal point of the positive lens 24, and let Lf3 be a distance from the focal point of the positive lens 24 to the positive lens 25. In the presence of the thermal lens, let Lf2s be a distance from the positive lens 24 to the focal point of the positive lens 24, and let Lf3s be a distance from the focal point of the positive lens 24 to the positive lens 25. In this case, Lf2>Lf2s, and Lf3<Lf3s. Therefore, the beam radius x3 in the positive lens 25 increases when the thermal lens occurs. In other words, when the gradient θ1 changes in the negative direction due to the thermal lens occurred, compared with the use of the negative lens 21 in the example illustrated in FIG. 10, the use of the positive lens 24 can reduce or prevent decrease of the beam radius x2 within the distance 11 and increase the beam radius x3 of a beam that is emitted from the expander 12. Thus, the thermal lens effect on a laser beam to be emitted from the laser apparatus 100 can be reduced.

Provided below is calculation of a difference in beam radius change between the case where the expander 12 includes the positive lens 24 on the entrance side and the case where the expander 12 includes the negative lens 21 on the entrance side. With x0 being a radius of a beam incident on the first acousto-optic modulator 3 and with G0 being an angle of incidence, beam propagation is derived with an ABCD ray matrix. The beam radius x3 in the positive lens 22 or 25 of the expander 12 is expressed by Formula (1) below. A focal length of the thermal lens is denoted as f1, and a focal length of the negative lens 21 or the positive lens 24 is denoted as f2. A distance from the negative lens 21 to the positive lens 22 or a distance from the positive lens 24 to the positive lens 25 is denoted as 12. The radius of the beam incident on the first acousto-optic modulator 3 is denoted as x0, and the angle of incidence of the beam incident on the first acousto-optic modulator 3 is denoted as G0.

[Formula 1]

$$x3 = -\frac{(-f1f2 + f2L1 + f1L2 + f2L2 - L1L2)x0}{f1f2} - \frac{(-f2L1 - f2L2 + L1L2)\theta 0}{f2} \quad (1)$$

When l3 is a distance from the expander 12 to an exit of the amplifier 103, a beam radius x4 at the exit of the amplifier 103 is expressed by Formula (2) below. A focal length of the positive lens 22 or 25 is denoted as f3.

[Formula 2]

$$x4 = \frac{1}{f1f2f3}((L1(-L2L3 + f3(L2 + L3)) \\ -f2(-(L1+L2)L3 + f3(L1+L2+L3)))x0 \\ +f1(-(-L2L3 + f3(L2+L3))(x0+L1\theta0) \\ +f2(-L3(x0+(L1+L2)\theta0) + f3(x0+ \\ (L1+L2+L3)\theta0)))) \quad (2)$$

Because the beam incident on the first acousto-optic modulator 3 is the parallel beam, θ0=0. Table 1 shows parameters that are used in calculations above. Shown under "Positive" in Table 1 are parameter values in the configuration of FIG. 11 that uses the positive lens 24 as the lens 10. Shown under "Negative" in Table 1 are parameter values in the configuration of FIG. 10 that uses the negative lens 21 as the lens 10. Table 2 shows calculation results of Formulas (1) and (2) that have used the parameters shown in Table 1. Shown under "Positive" in Table 2 are calculation results for the configuration of FIG. 11 that uses the positive lens 24 as the lens 10. Shown under "Negative" in Table 2 are calculation results for the configuration of FIG. 10 that uses the negative lens 21 as the lens 10.

TABLE 1

|  | Positive | Negative |
| --- | --- | --- |
| f1 | 7000 | 7000 |
| f2 | 63.5 | −63.5 |
| f3 | 190.5 | 190.5 |
| L1 | 10 | 400 |
| L2 | 254 | 127 |
| L3 | 5000 | 5000 |
| x0 | 4 | 4 |
| θ0 | 0 | 0 |

TABLE 2

|  | Positive | Negative |
| --- | --- | --- |
| x3 | 12.1 | 11.2 |
| x4 | 11.2 | 10.3 |
| Average | 11.7 | 10.8 |
| Relative Change | 0.029 | 0.103 |

It is assumed that a radius of a beam passing through the amplifier 103 is an average of the beam radius x3 at an entrance of the amplifier 103 and the beam radius x4 at the exit of the amplifier 103, and a relative change from 12 mm, which is the beam radius in the absence of the thermal lens, is calculated. Table 2 shows that the thermal lens-induced change in expanded beam radius is 10.3% for the configuration illustrated in FIG. 10 but is reduced to 2.9% for the configuration illustrated in FIG. 11.

As described above, in the configuration where the thermal lens is easy to occur, the expander 12 that uses the positive lenses 24 and 25 is capable of reducing the thermal lensing effect compared to when the expander 12 uses the negative lens 21. When the thermal lens occurs, the focal point shifts, so the beam radius at the specific position changes. If the thermal lens effect is significant to cause a significant change in beam radius during machining, a mode volume in the amplifier 103 changes, the beam power changes, a focused beam diameter at a machining point and a focal shift change. Therefore, the machining quality deteriorates. Because the expander 12 is configured to include the positive lens 24 on the entrance side, the laser apparatus 100 enables to reduce or prevent the change in beam radius and obtain higher-quality laser beam machining.

Second Embodiment

Figure 12:
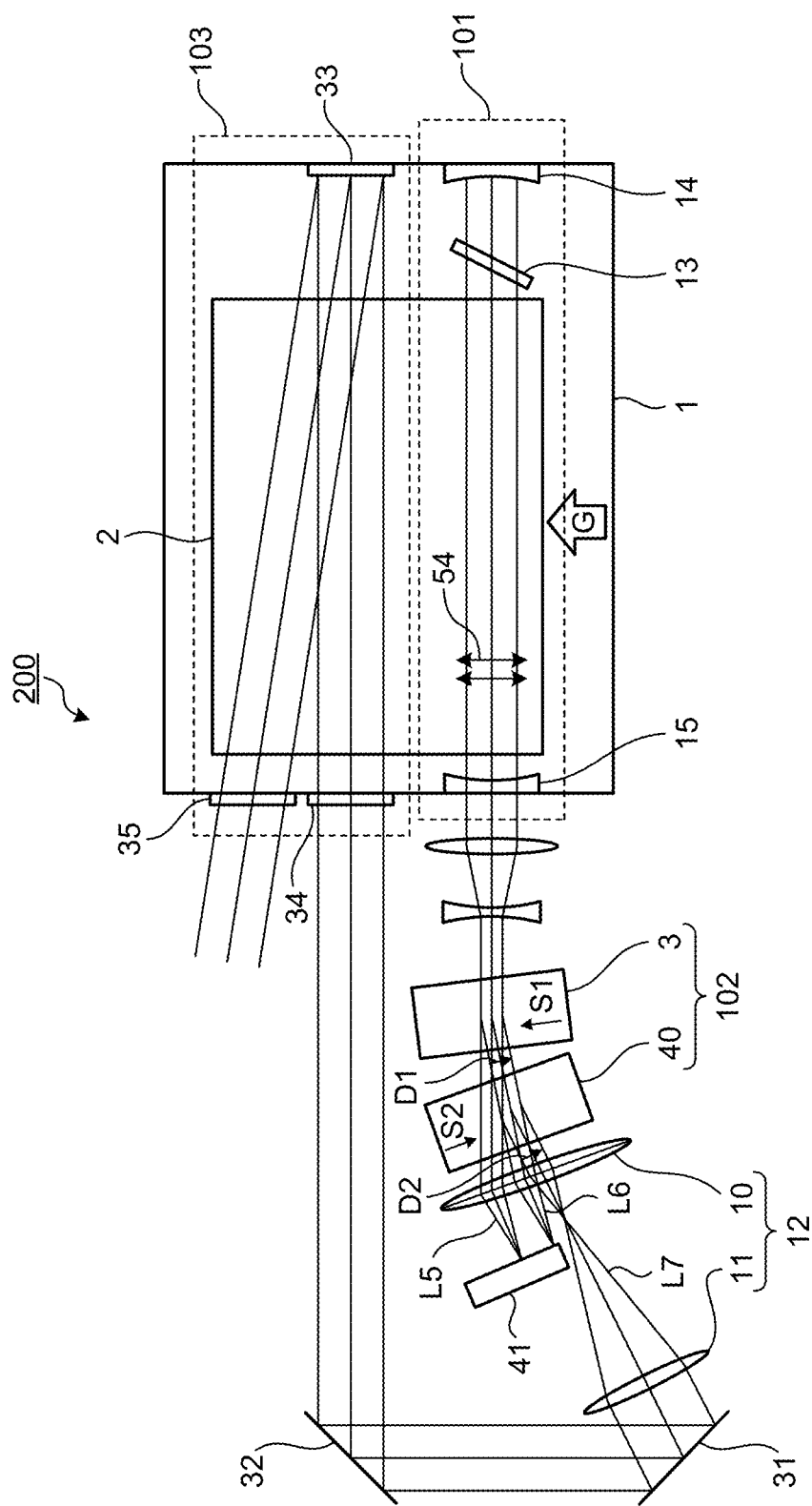
FIG. 12 is a diagram illustrating a configuration of a laser apparatus according to a second embodiment.

FIG. 12 is a diagram illustrating a configuration of a laser apparatus 200 according to a second embodiment. A description is hereinafter provided mainly of difference from the laser apparatus 100 according to the first embodiment. The laser apparatus 200 includes a damper 41 instead of the dampers 5 and 6 of the laser apparatus 100 and a second acousto-optic modulator 40 instead of the second acousto-optic modulator 4. As in the laser apparatus 100, the propagation direction S1 of a first ultrasonic wave is opposite to the diffracted direction D1 of a first order beam of the first acousto-optic modulator 3, and the propagation direction S2 of a second ultrasonic wave is the same as the diffracted direction D2 of a first order beam of the second acousto-optic modulator 40. In the laser apparatus 200, the second acousto-optic modulator 40 is disposed with the diffracted direction D2 of its first order beam being the same as the diffracted direction D1 of the first order beam of the first acousto-optic modulator 3. Therefore, a zeroth order beam L5 of the first acousto-optic modulator 3 and the first order beam L7 of the second acousto-optic modulator 40 are emitted in different directions. In this case, the damper 41 can be disposed downstream of the lens 10 and near a focal point of the lens 10 to absorb the zeroth order beam L5 of the first acousto-optic modulator 3 and a zeroth order beam L6 of the second acousto-optic modulator 40, and the first and second acousto-optic modulators 3 and 40 can be disposed in closer proximity.

If the damper 5 is omitted from the configuration of the laser apparatus 100 illustrated in FIG. 1, the zeroth order beam L2 of the first acousto-optic modulator 3 travels in the same direction as the first order beam L4 of the second acousto-optic modulator 4 after being transmitted by the second acousto-optic modulator 4. If the first and second acousto-optic modulators 3 and 4 are brought closer together in this case, the zeroth order beam L2 and the first order beam L4 overlap, so the zeroth order beam L2 of the first acousto-optic modulator 3 cannot be removed. In contrast, the zeroth order beam L5 of the first acousto-optic modulator 3 and the first order beam L7 of the second acousto-optic modulator 40 travel in the different directions in the laser apparatus 200, because the diffracted direction D1 of the first acousto-optic modulator 3 is made the same as the diffracted direction D2 of the second acousto-optic modulator 40. Therefore, the damper 41 can be disposed near the focal point of the lens 10, and the first and second acousto-optic modulators 3 and 40 can be disposed in closer proximity. A laser beam propagation distance from the first acousto-optic modulator 3 to the expander 12 becomes shorter in this case, thus it is possible to reduce or prevent a change in incoming beam radius x2 at the expander 12 that is caused by a change in gradient θ1 to be restrained when a thermal lens occurs in the first acousto-optic modulator 3. Therefore, the beam radius of the laser apparatus 200 becomes more stabler so that the laser output power is stabilized, thereby good machining quality can be maintained.

Third Embodiment

Figure 13:
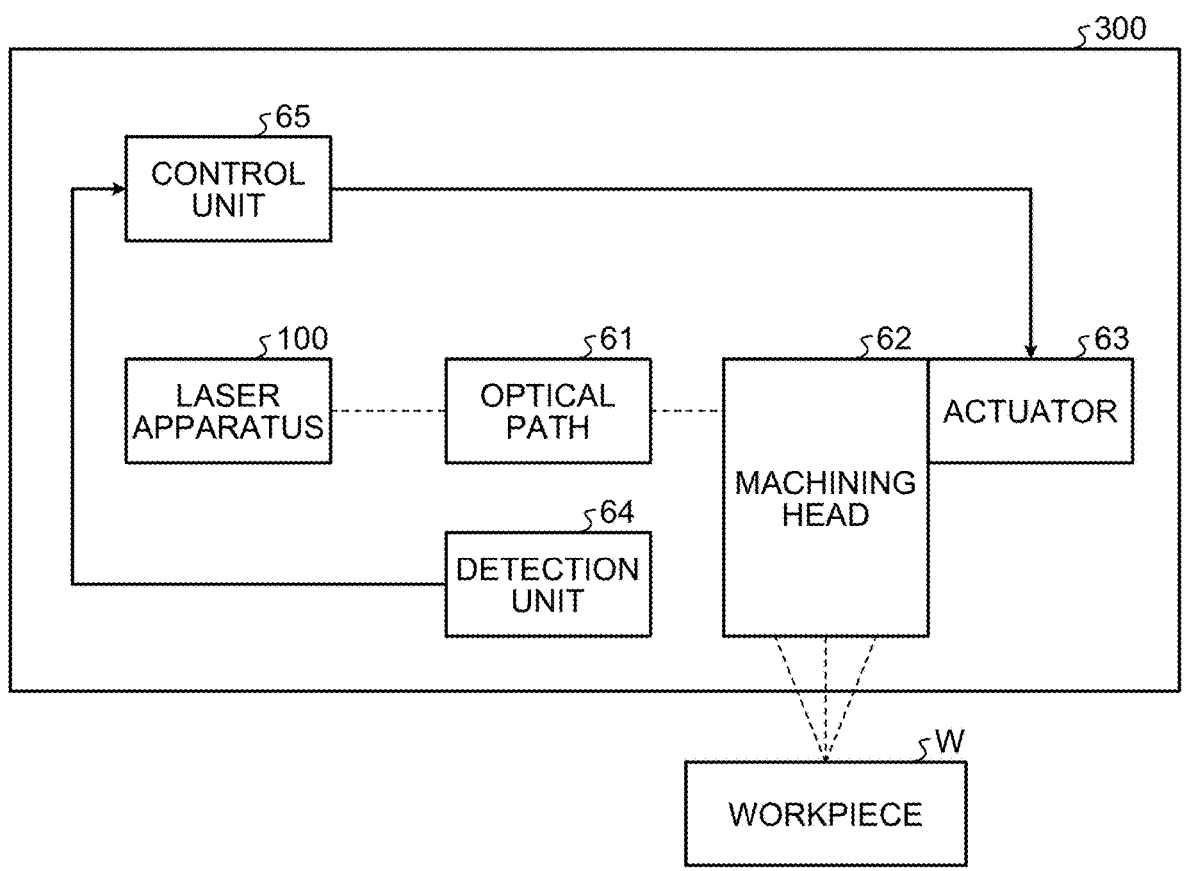
FIG. 13 is a diagram illustrating a configuration of a laser machining apparatus according to a third embodiment.

FIG. 13 is a diagram illustrating a configuration of a laser machining apparatus 300 according to a third embodiment.

The laser machining apparatus 300 includes the laser apparatus 100, an optical path 61, a machining head 62, an actuator 63, a detection unit 64, and a control unit 65.

The laser machining apparatus 300 has a function of cutting a workpiece W through irradiation of the workpiece W with a pulsed laser beam. The laser apparatus 100 is the laser apparatus 100 described in the first embodiment, and its laser beam taken out through the window 35 is supplied to the machining head 62 via the optical path 61. The optical path 61 is a path that transmits the laser beam output from the laser apparatus 100 to the machining head 62. The optical path 61 may be a path along which the laser beam is propagated through the air or a path along which the laser beam is transmitted through an optical fiber. The optical path 61 is designed in accordance with characteristics of the laser beam that the laser apparatus 100 outputs.

The machining head 62 includes an optical system that focuses the laser beam on the workpiece W. The optical system included in the machining head 62 preferably provides a focal point near a surface of the workpiece W. The actuator 63 is capable of changing relative positions of the machining head 62 and the workpiece W through control. The actuator 63 of the laser machining apparatus 300 shifts the machining head 62 to change the relative positions of the machining head 62 and the workpiece W; however, the actuator 63 may shift a table on which the workpiece W is placed or may shift both the machining head 62 and the table. In other words, it is sufficient that the actuator 63 has the function of shifting at least one of the machining head 62 or the workpiece W.

The detection unit 64 is a sensor that detects a state of the workpiece W or a state of the laser machining apparatus 300. The detection unit 64 measures a physical quantity, such as a position of the workpiece W during machining, an intensity and a wavelength of light generated during machining, a sound wave, or an ultrasonic wave, to have the measurement in the form of a time-series signal. Examples of the detection unit 64 include a capacitive sensor, a photodiode, a charge-coupled device (CCD) sensor, a complementary metal-oxide-semiconductor (CMOS) sensor, a spectroscope, an acoustic sensor, an acceleration sensor, a gyrosensor, a distance sensor, a position sensor, a temperature sensor, and a humidity sensor, among others. The detection unit 64 inputs the time-series signal indicating the measurement to the control unit 65.

On the basis of preset machining conditions and the measurement sent from the detection unit 64, the control unit 65 controls those such as the laser apparatus 100 and the actuator 63 to cause the pulsed laser beam to scan along a machining path on the workpiece W. The machining conditions include, for example, a material, a thickness, and a surface condition of the workpiece W. The machining conditions further include laser output intensity of the laser apparatus 100, a laser output frequency, a duty ratio of laser output power, a mode, a waveform, and a wavelength, among others. The machining conditions may include the measurement that is input from the detection unit 64, such as a focal position of the pulsed laser beam, a focused beam diameter of the pulsed laser beam, a distance between the workpiece W and the machining head 62, a temperature, or a humidity.

With the actuator 63 changing the relative positions of the machining head 62 and the workpiece W under the control of the control unit 65, the machining head 62 irradiates the workpiece W with the pulsed laser beam. In this way, cutting the workpiece W is enabled.

The laser machining apparatus 300 according to the above-described third embodiment has the laser apparatus 100 but may have the laser apparatus 200 according to the second embodiment instead of the laser apparatus 100.

The above configurations illustrated in the embodiments are illustrative, can be combined with other techniques that are publicly known, and can be partly omitted or changed without departing from the gist. The embodiments can be combined together.

For example, while the down collimator 9 is used in FIGS. 1 and 12 to adjust the beam diameter of the beam output from the laser oscillator 101, the present embodiments are not limited to this example. For example, the totally reflecting mirror 14 and the partially reflecting mirror 15 may be designed so that the down collimator 9 is omitted and a beam diameter of the beam emitted from the laser oscillator 101 enters the acousto-optic modulator.

While the laser oscillator 101 and the amplifier 103 share the laser medium and are disposed in the single housing 1 in the above embodiments, the present embodiments are not limited to this example. The laser oscillator 101 and the amplifier 103 may be disposed in separate housings.

The illustrated propagation directions S1 and S2 of the ultrasonic waves are examples and may be opposite to the illustrated directions.

While the above-described acousto-optic modulation unit 102 has the two acousto-optic modulators, the present embodiments are not limited to this example. For example, the acousto-optic modulation unit 102 may have three or more acousto-optic modulators. In this case, at least two of the plural acousto-optic modulators output first order beams, and the two acousto-optic modulators that output the first order beams differ in propagation direction of an ultrasonic wave relative to a diffracted direction.

With the application of the first ultrasonic wave, the first acousto-optic modulator 3 diffracts the laser beam L1 from the laser oscillator 101. The laser beam L1 from the laser oscillator 101 is not limited to the laser beam L1 that enters directly from the laser oscillator 101 here. For example, the laser beam L1 from the laser oscillator 101 may be the laser beam L1 that enters through the down collimator 9 as illustrated in FIG. 1, or the laser beam L1 that enters through another acousto-optic modulator in cases where the acousto-optic modulation unit 102 includes the three or more acousto-optic modulators. With the application of the second ultrasonic wave, the second acousto-optic modulator 4 similarly diffracts the first order beam L3 output from the first acousto-optic modulator 3. The first order beam L3 that is output from the first acousto-optic modulator 3 may here be the first order beam L3 that enters the second acousto-optic modulator 4 directly from the first acousto-optic modulator 3 as illustrated in FIG. 1. Alternatively, the first order beam L3 that is output from the first acousto-optic modulator 3 may be the first order beam L3 that enters through another acousto-optic modulator when, for example, the acousto-optic modulation unit 102 includes three or more acousto-optic modulators.

The laser beam L1 that is output from the laser oscillator 101 is continuous-wave in the above description. However, in some cases, the beam is turned off for a long time because of a wide pulse interval, the discharge is turned off to intermittently operate the beam of the laser oscillator 101 to reduce energy consumption. In such cases, the laser beam L1 that is output from the laser oscillator 101 is not continuous-wave. The acousto-optic modulation unit 102 is capable of converting even such a laser beam L1 into a pulsed laser beam.

REFERENCE SIGNS LIST 1 housing; 2 discharge pumped gas; 3 first acousto-optic modulator; 4, 40 second acousto-optic modulator; 5, 6, 41 damper; 7 positive lens; 8 negative lens; 9 down collimator; 10, 11 lens; 12 expander; 13 Brewster window; 14 totally reflecting mirror; 15 partially reflecting mirror; 31, 32, 33 mirror; 34, 35 window; 54 linearly polarized light; 61 optical path; 62 machining head; 63 actuator; 64 detection unit; 65 control unit; 100, 200 laser apparatus; 101 laser oscillator; 102 acousto-optic modulation unit; 103 amplifier; 300 laser machining apparatus; D1, D2 diffracted direction; f1, f2, f3 focal length; G laser gas; L1 laser beam; L2, L5, L6 zeroth order beam; L3, L4, L7 first order beam; l1, l2, l3, Lf2, Lf2s distance; $O_{101}$, $O_{103}$ laser output power; S1, S2 propagation direction; W workpiece; x0, x1, x2, x3, x4 beam radius; G0 angle of incidence; θ1, θ2, θ3 gradient.

The invention claimed is:

1. A laser apparatus comprising:
a laser oscillator where mode hopping occurs;
an acousto-optic modulator including a first acousto-optic modulator to diffract a laser beam from the laser oscillator when a first ultrasonic wave is applied and a second acousto-optic modulator to diffract a higher order beam output from the first acousto-optic modulator when a second ultrasonic wave is applied, a propagation direction of the first ultrasonic wave relative to a diffracted direction of a higher order beam emitted from the first acousto-optic modulator and a propagation direction of the second ultrasonic wave relative to a diffracted direction of a higher order beam emitted from the second acousto-optic modulator being different in causing a frequency shift that is caused by the first acousto-optic modulator and a frequency shift that is caused by the second acousto-optic modulator to cancel each other out;
an amplifier to amplify a laser beam from the acousto-optic modulator; and
an expander to expand a beam diameter of the laser beam, the expander being disposed on an optical path between the acousto-optic modulator and the amplifier.

2. The laser apparatus according to claim 1, wherein the expander includes a positive lens on an entrance side.

3. The laser apparatus according to claim 2, further comprising
a damper to absorb a zeroth order beam emitted from the first acousto-optic modulator and a zeroth order beam emitted from the second acousto-optic modulator, the damper being disposed downstream of the positive lens of the expander, wherein
a diffracted direction of a higher order beam emitted from the first acousto-optic modulator is the same as a diffracted direction of a higher order beam emitted from the second acousto-optic modulator.

4. The laser apparatus according to claim 3, wherein the higher order beam is a first order beam.

5. A laser machining apparatus comprising the laser apparatus according to claim 4.

6. A laser machining apparatus comprising the laser apparatus according to claim 3.

7. The laser apparatus according to claim 2, wherein the acousto-optic modulator converts a laser beam output from the laser oscillator into a pulsed laser beam.

8. The laser apparatus according to claim 7, wherein the higher order beam is a first order beam.

9. A laser machining apparatus comprising the laser apparatus according to claim 8.

10. A laser machining apparatus comprising the laser apparatus according to claim 7.

11. The laser apparatus according to claim 2, wherein the higher order beam is a first order beam.

12. A laser machining apparatus comprising the laser apparatus according to claim 11.

13. A laser machining apparatus comprising the laser apparatus according to claim 2.

14. The laser apparatus according to claim 1, wherein the acousto-optic modulator converts a laser beam output from the laser oscillator into a pulsed laser beam.

15. The laser apparatus according to claim 14, wherein the higher order beam is a first order beam.

16. A laser machining apparatus comprising the laser apparatus according to claim 15.

17. A laser machining apparatus comprising the laser apparatus according to claim 14.

18. The laser apparatus according to claim 1, wherein the higher order beam is a first order beam.

19. A laser machining apparatus comprising the laser apparatus according to claim 18.

* * * * *